Patented Dec. 17, 1935

2,024,613

UNITED STATES PATENT OFFICE 2,024,613

CARBAMYL DISULPHIDES AND PREPARATION THEREOF

Jan Teppema, Cuyahoga Falls, Ohio, assignor to Wingfoot Corporation, Wilmington, Del., a corporation of Delaware No Drawing. Application March 20, 1934, Serial No. 716,505

22 Claims. (Cl. 260—16)

This invention has for its object carbamyl disulphides and the process of preparing them which compounds are valuable both as such and in conjunction with other substances in the vulcanization of rubber. The invention involves, among other things, the discovery that mixed carbamyl disulphides may be prepared by interacting a water-soluble salt of a substituted dithiocarbamic acid and an aromatic sulphur halide of the type represented by the formula X—S—R wherein R is an aromatic radical and X is a halogen. The compounds which the invention concerns may be illustrated by the type formula

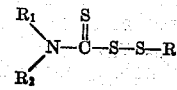

wherein R is the aromatic radical of the aromatic sulphur halide, wherein $R_1$ is either hydrogen or an aliphatic or aromatic radical, and wherein $R_2$ is an aliphatic or aromatic radical. In some cases, $R_1$ and $R_2$ may be regarded as joined to form a closed chain, either directly or through a heterogeneous atom. In no case, however, will both $R_1$ and $R_2$ be strictly aromatic.

In the practice of the invention, these reaction products may be prepared by heating the desired aromatic sulphur halide and the desired water-soluble salt of a substituted dithio-carbamic acid in a liquid medium. As a rule, it will be found preferable to heat the materials in a vessel attached to a reflux condenser. Any suitable liquid medium may be employed, but water, benzol, carbon bisulphide or the like will usually be found to be satisfactory. In general, it is desirable to employ a liquid medium in which the respective reactants can be readily dissolved or otherwise dispersed, thus facilitating the reaction. It is possible to disperse or dissolve the reactants separately and later combine the liquids containing them or to disperse or dissolve them both in the same liquid.

Illustrating the invention, the reaction product of 2-benzoyl 4-nitro phenyl sulphur bromide and the sodium salt of diethyl dithiocarbamic acid may be prepared by reacting in benzol solution 8.5 parts by weight of sodium diethyl dithiocarbamate and 16.9 parts by weight of benzoyl 4-nitro phenyl sulphur bromide. This mixture is heated under a reflux condenser for a period of approximately one hour, after which the volatile constituents are distilled off upon a steam bath. The residue is then poured into boiling water to remove any traces of benzol that may remain. The desired reaction product is obtained from the cold solution as a caked mass which readily dissolves in hot water. The reaction involved is believed to be represented by the following equation:

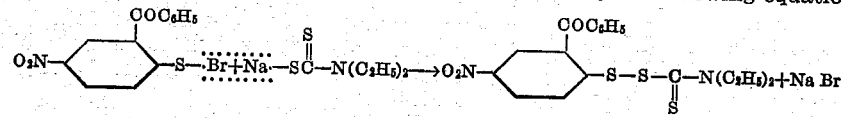

In lieu of the sodium salt of diethyl dithiocarbamic acid there may be employed any water-soluble salt of an N-substituted dithiocarbamic acid. Examples are sodium pentamethylene dithiocarbamate, ammonium dimethyl dithiocarbamate, potassium dipropyl dithiocarbamate, sodium ethyl phenyl dithiocarbamate, potassium dicyclohexyl dithiocarbamate and the like. Still other dithiocarbamic acid salts which may be employed are, for example, derivatives of such amines as cyclohexylamine, hexahydroquinoline, methyl aniline, morpholine, methyl cyclohexylamine, ethyl cyclohexylamine, dibutylamine, butylamine, dibenzylamine, diiso amyl amine, di tetrahydro furfuryl amine, methyl naphthylamine, di-furfurylamine, butyl cyclohexylamine and the like. Generally the ammonium and alkali metal salts will be found preferable, although others, such as the cadmium, zinc and barium salts may be employed if desired.

Instead of 2-benzoyl 4-nitro phenyl sulphur bromide may be employed such aromatic sulphur halides as the following:

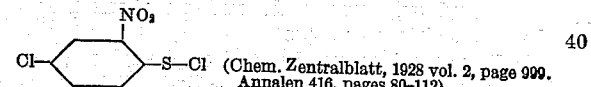 (Chem. Zentralblatt, 1928 vol. 2, page 999. Annalen 416, pages 80-112)

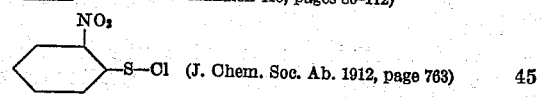 (J. Chem. Soc. Ab. 1912, page 763)

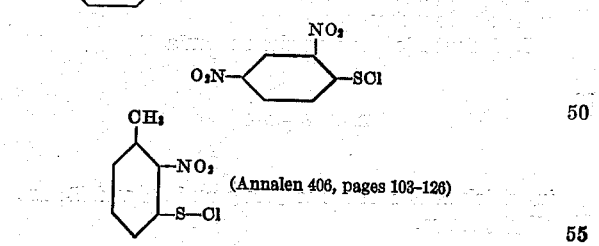 (Annalen 406, pages 103-126)

In lieu of the foregoing, the corresponding bromides and iodides may of course be used. Others are, for example, phenyl sulphur chloride, phenyl sulphur bromide, para nitro phenyl sulphur chloride, ortho tolyl sulphur chloride, 2-nitro 4-acetyl phenyl sulphur bromide, 1-brom naphthyl 2-sulphur bromide, and the like.

It is apparent that by the practice of the invention an extremely simple method of preparing mixed disulphides of various organic compounds is provided.

Examples of compounds that may be prepared by this method are 2-benzoyl 4-nitro phenyl diethyl thio carbamyl disulphide, 2-benzoyl 4-nitro phenyl dimethyl thio carbamyl disulphide, 2-benzoyl 4-nitro phenyl dibutyl thio carbamyl disulphide, 2-benzoyl 4-nitro phenyl dicyclohexyl thio carbamyl disulphide, 2-benzoyl 4-nitro phenyl pentamethylene thio carbamyl disulphide, 2-benzoyl 4-nitro phenyl ethyl cyclohexyl thio carbamyl disulphide, o-nitro phenyl ethyl cyclohexyl thio carbamyl disulphide, o-nitro phenyl dicyclohexyl thio carbamyl disulphide, o-nitro phenyl dimethyl thio carbamyl disulphide, o-nitro phenyl diamyl thio carbamyl disulphide, o-nitro phenyl morpholyl, thio carbamyl disulphide, etc. Still others are 2-nitro 4-chlor phenyl morpholyl thio carbamyl disulphide, 2-nitro 4-chlor phenyl pentamethylene thio carbamyl disulphide, 2-nitro 4-chlor phenyl difurfuryl thio carbamyl disulphide, ortho tolyl ethyl phenyl thio carbamyl disulphide, ortho tolyl dibenzyl thio carbamyl disulphide, 4-nitro phenyl dibenzyl thio carbamyl disulphide, 2-4-dinitro phenyl dibenzyl thio carbamyl disulphide, 2-4-dinitro phenyl dimethyl thio carbamyl disulphide and 2-nitro 3-methyl phenyl dimethyl thio carbamyl disulphide.

This application is, in part, a continuation of application Serial No. 525,043, filed March 24, 1931, which is a continuation of application Serial No. 239,267, filed December 10, 1927, since matured into Patent No. 1,809,457.

Although only the preferred embodiments of the invention have been described, it will be apparent to those skilled in the art that the invention is not so limited but that various modifications may be made therein without departing from the spirit of the invention or from the scope of the appended claims. It is intended that the patent shall cover, by suitable expression in the appended claims, whatever features of patentable novelty reside in the invention.

What I claim is:

1. The reaction product of 2-benzoyl 4-nitro phenyl sulphur bromide and the sodium salt of diethyl dithiocarbamic acid.

2. The reaction product of a 2-benzoyl 4-nitro phenyl sulphur halide and an alkali metal N-alkyl dithiocarbamate.

3. The reaction product of a phenyl sulphur halide and an alkali metal N-alkyl dithiocarbamate.

4. A reaction product of a nitro-substituted benzenoid sulphur halide and an alkali metal salt of a dithiocarbamate.

5. A material having the formula

in which R is a benzene group and $R_1$ and $R_2$ are alkyl groups.

6. A method of preparing materials having the formula

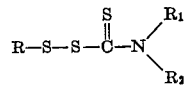

in which R is a benzenoid group and $R_1$ and $R_2$ are alkyl groups, which comprises reacting a benzenoid sulphur halide with an N-alkylated dithiocarbamate.

7. A compound having the formula

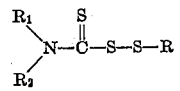

wherein $R_1$ is a radical selected from hydrogen and the hydrocarbons, $R_2$ is an aliphatic radical and R is an aromatic radical in which a ring of the aromatic nucleus is directly connected to the sulphur atom of the disulphide group.

8. A compound having the formula

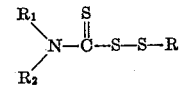

wherein $R_1$ is a radical selected from hydrogen and the hydrocarbons, $R_2$ is an aliphatic radical and R is an aromatic group of the benzene and naphthalene series in which a ring of the aromatic nucleus is directly connected to the sulphur atom of the disulphide group.

9. A compound having the formula

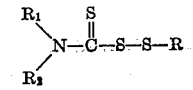

wherein $R_1$ and $R_2$ are hydrocarbon and R is an aromatic radical in which a ring of the aromatic nucleus is directly connected to the sulphur atom of the disulphide group.

10. A compound having the formula

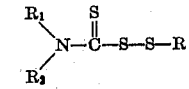

wherein R is a benzene group and $R_1$ and $R_2$ are alkyl groups or $R_1$ and $R_2$ taken together represent a pentamethylene chain.

11. The compound having the formula

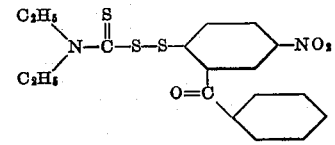

12. The process of preparing materials having the formula

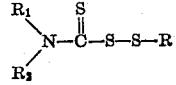

in which R is an aromatic radical, $R_2$ is alkyl and $R_1$ is a radical selected from hydrogen and the hydrocarbons, which comprises reacting an aromatic sulphur halide with an N-alkylated dithiocarbamate.

13. The process of preparing disulphides having the formula

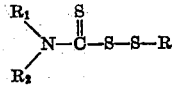

wherein R is a nitro aromatic radical of the benzene and naphthalene series and $R_1$ and $R_2$ are hydrocarbon radicals, which comprises reacting a nitro benzenoid sulphur halide with a water soluble salt of an N-dihydrocarbon substituted dithiocarbamic acid.

14. The process of preparing a nitro phenyl thiocarbamyl disulphide in which the nitro phenyl radical is directly attached to a disulphide sulphur atom which comprises reacting a nitro phenyl sulphur halide with an alkali metal dithiocarbamate.

15. The method of preparing compounds having the formula

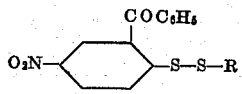

in which R represents an N-substituted thio carbamyl radical which comprises reacting a 2-benzoyl 4-nitro phenyl sulphur halide with a water soluble salt of an N-substituted dithiocarbamic acid.

16. The process of preparing compounds having the formula

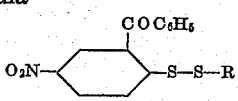

in which R represents an N-disubstituted thio carbamyl radical which comprises reacting 2-benzoyl 4-nitro phenyl sulphur bromide with an alkali metal salt of an N-disubstituted dithiocarbamic acid.

17. The process of preparing 2-benzoyl 4-nitro phenyl diethyl thio carbamyl disulphide which comprises reacting a 2-benzoyl 4-nitro phenyl sulphur halide with a water soluble salt of diethyl dithiocarbamic acid.

18. The process of preparing an aromatic thio carbamyl disulphide in which the aromatic radical is directly attached to a disulphide sulphur atom which comprises reacting an aromatic sulphur halide with a water soluble dithiocarbamate.

19. An aromatic thio carbamyl disulphide in which the aromatic radical is directly attached to a disulphide sulphur atom.

20. A process of preparing a rubber vulcanization accelerator which comprises reacting a dithio-carbamate with a nitro substituted phenyl halogen mercaptan.

21. A process of preparing a rubber vulcanization accelerator which comprises reacting a dithio-carbamate with a nitro substituted aryl halogen mercaptan.

22. The product formed by reacting a di-thiocarbamate with a nitro substituted phenyl halogen mercaptan.

JAN TEPPEMA.